United States Patent

[11] 3,617,750

[72] Inventor Harold R. Walker
Metuchen, N.J.

[21] Appl. No. 9,113
[22] Filed Feb. 9, 1970
[45] Patented Nov. 2, 1971
[73] Assignee Laser Link Corporation
New York, N.Y.
Continuation-in-part of application Ser. No. 585,647, Oct. 10, 1966, now abandoned, which is a continuation of Ser. No. 623,169, Feb. 6, 1967, abandoned.

[54] LASER LINK COMMUNICATION SYSTEM
2 Claims, 15 Drawing Figs.

[52] U.S. Cl. .......... 250/199
[51] Int. Cl. .......... H04b 9/00
[50] Field of Search .......... 250/199
343/100; 325/31

[56] References Cited
UNITED STATES PATENTS

| | | | |
|---|---|---|---|
| 2,100,348 | 11/1937 | Nicolson | 250/199 |
| 3,284,633 | 11/1966 | Hathaway | 250/199 |
| 2,599,368 | 6/1952 | Bruce et al. | 250/199 |
| 3,327,121 | 6/1967 | Thomas | 250/199 |
| 3,365,572 | 1/1968 | Strauss | 246/167 |
| 3,405,370 | 10/1968 | Kaminow | 331/94.5 |
| 2,506,672 | 5/1950 | Kell et al. | 250/199 |

*Primary Examiner*—Robert L. Griffin
*Assistant Examiner*—Albert J. Mayer
*Attorney*—Leonard H. King

ABSTRACT: A laser modulator and its application to a communication system and in particular to a television signal distribution system employing modulated laser beams is disclosed.

INVENTOR.
HAROLD R. WALKER
BY
Leonard H. King
ATTORNEY

INVENTOR.
HAROLD R. WALKER
BY
Leonard H. King
ATTORNEY

PATENTED NOV 2 1971 3,617,750

INVENTOR.
HAROLD R. WALKER
BY
Leonard H. King
ATTORNEY

INVENTOR.
HAROLD R. WALKER
BY
Leonard H. King
ATTORNEY

INVENTOR.
HAROLD R. WALKER
BY
Leonard H. King
ATTORNEY

INVENTOR.
HAROLD R. WALKER

BY Leonard H. King

ATTORNEY

LASER LINK COMMUNICATION SYSTEM

RELATED APPLICATIONS

This application is a continuation of copending application Ser. No. 623,169 filed continuation-in-part 6, 1967 which was in turn a continuation-in-part of copending application Ser. No. 585,647 filed Oct. 10, 1966, both copending applications now abandoned.

In urban areas, municipal regulations usually require the cable to go underground as external poles generally are not permitted. In these areas the CATV operator is faced with the problem of the high cost of making underground installations There is usually a labyrinth of underground ducts or tunnels. However, the telephone companies owning suitable underground facilities generally insist that any cables and amplifiers installed in their ducts must be owned, operated and maintained by them in order to protect the other vital message services installed in the common ductwork. Therefore, a CATV operator is limited in his title to the television antennas and the connection the telephone company installed outlet and the subscriber's television set. It is highly desirable that the CATV operator be independent of the telephone company so as to provide flexiblity in meeting installation dates and to avoid the necessity for the paying of expensive cable charges.

To bypass this complication and provide an urban CATV service which can be installed, maintained and owned by the CATV operator, this invention contemplates a transmission and reception system through the air by means of laser links. This novel system will have value also in rural and suburban areas where costly cable installations would normally be required to cross waterways, mountain valleys, etc.

The laser link communication system as hereinafter described overcomes the high linearity problem inherent to microwave systems as well as allowing laser communication over short distance through rain, fog and smog and also allows broadcasting in an uncluttered spectrum not susceptible to distortion from aircraft. The system would be operative under all atmospheric conditions except for very rare periods of intense rain of large particle size, hail and extremely dense fog. To avoid interruption of communication during such periods, which for most areas may represent an almost negligible frequency of occurrence, the preferred embodiment of this invention provides means for automatically switching to a secondary antenna in the event of interruption of the laser link.

The use of the laser link as a source of monochromatic or coherent light of high energy level has become well known. However, at the present time it is extremely difficult to utilize this light for broadband, low distortion communications. Various methods of modulation have been used but are limited due to the problems of linearity and bandwidth limitations.

It is therefore an object of this invention to provide a broadband communication system.

Another object of this invention is to provide a television distribution system employing a laser link.

A further object of this invention is to provide an improved community antenna distribution system and requiring the use of leased communication lines.

Another object of this invention is to provide an improved laser modulation system.

A further object is to provide an improved laser detection system.

A further object is to provide a communications system employing a laser link means to automatically switch to a secondary system in the event of an interruption of the laser beam.

Further objects and advantages will become apparent from the following description of the invention taken in conjunction with the figures, in which.

Figure 1:
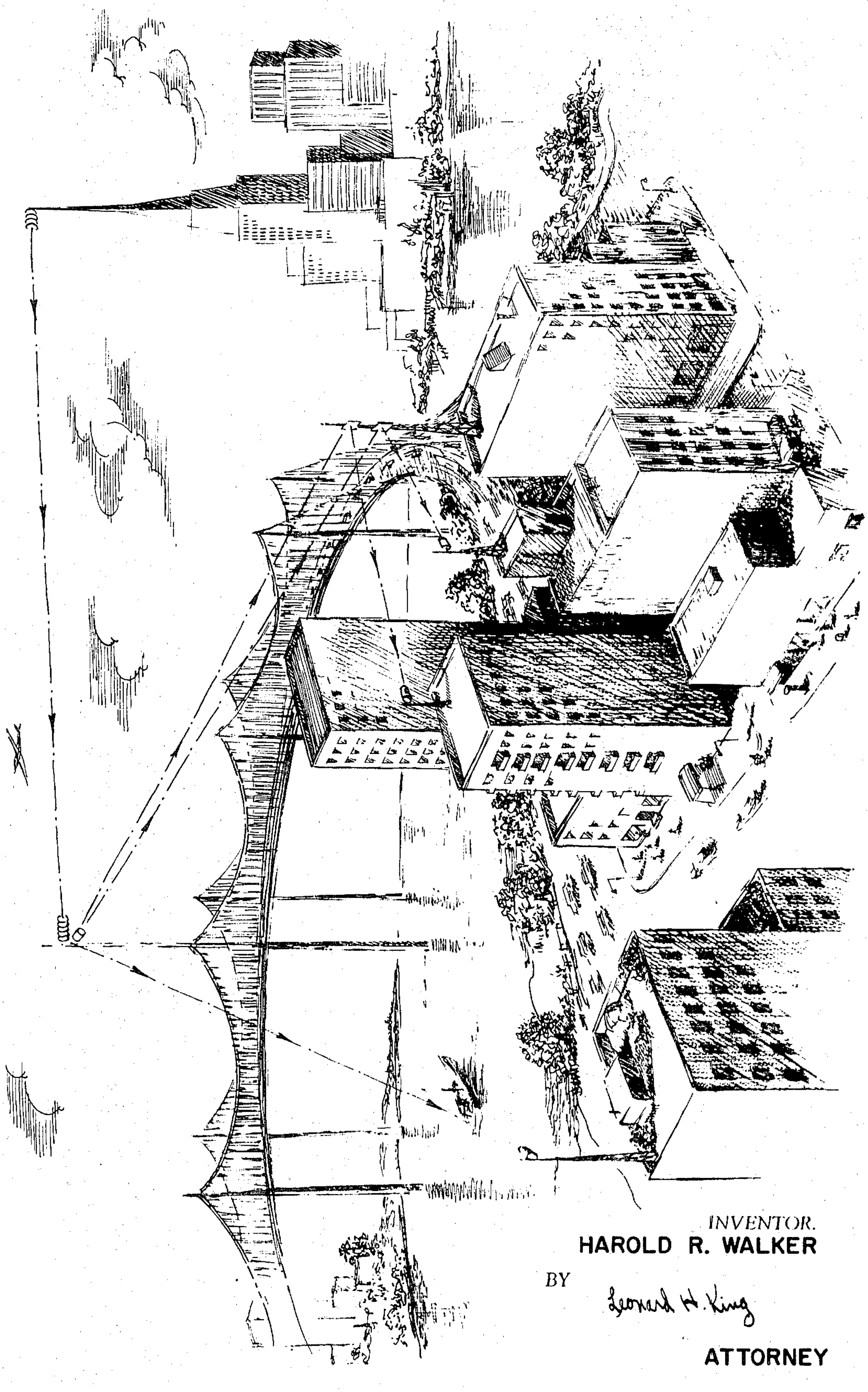
FIG. 1 is a pictorial view of a laser link CATV system employed in a large city.
Figure 2A:
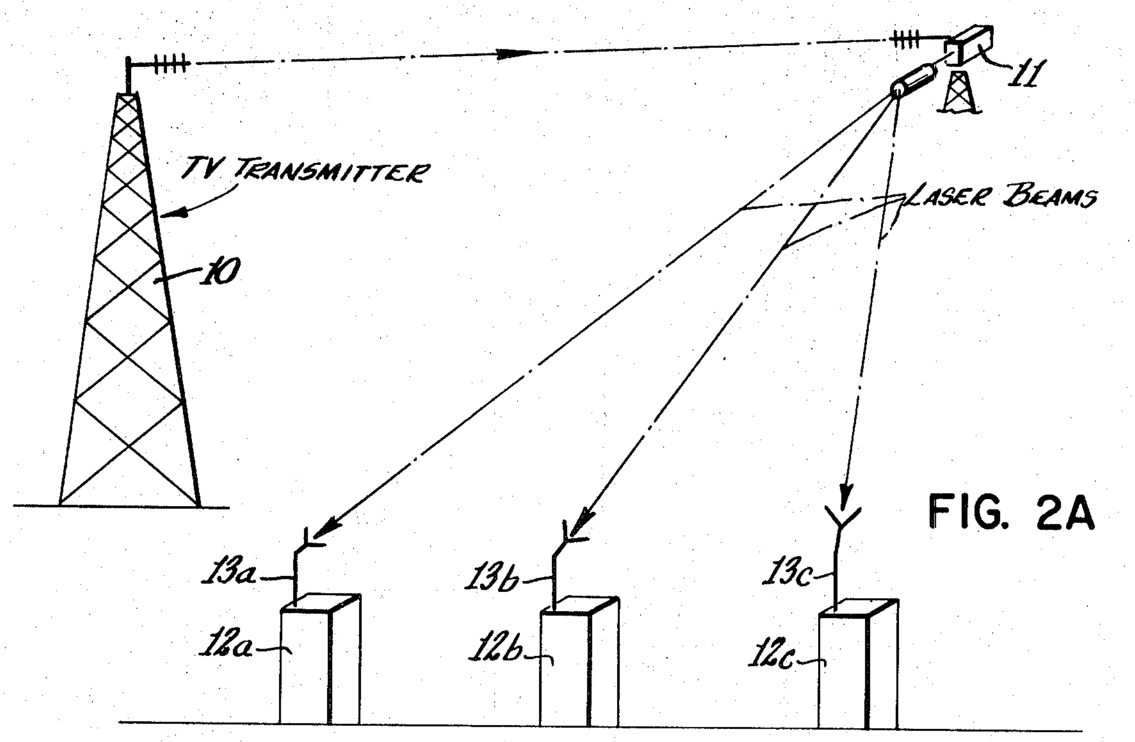
FIG. 2A is a drawing of an entire broadband communication system employing a laser link.

FIG. 1 indicates the use of a laser link as part of an entire communications system for the transmission of data. Referring to FIG. 2A, signal originates from a transistor 10 and is received by the transceiver 11. The signal may be a VHF television signal, a color television signal or any modulated wave. Typically the transmitter would be the TV station. The transceiver is usually placed in a centrally located position whereby it can then relay the signal onto the local receivers. In the instant invention a receiver and associated circuitry including the laser modulation system would be incorporated within the transceiver 11 so that the output would be a laser beam modulated to contain the same information as the original signal. The laser signals are then transmitted to various locations 12*a*, 12*b*, 12*c*, each equipped with a laser detector 13*a*, 13*b*, 13*c*, and associated amplifiers and coaxial cable distribution system. The local detectors could be located on a single building in each block and then distributed to individual television receivers in the building a coaxial cable system.

There is no problem in interconnecting buildings on a given block with a central receiving antenna mounted on a building on that block since it is not necessary to cross streets and usual communications lines could then be employed.

Figure 2B:
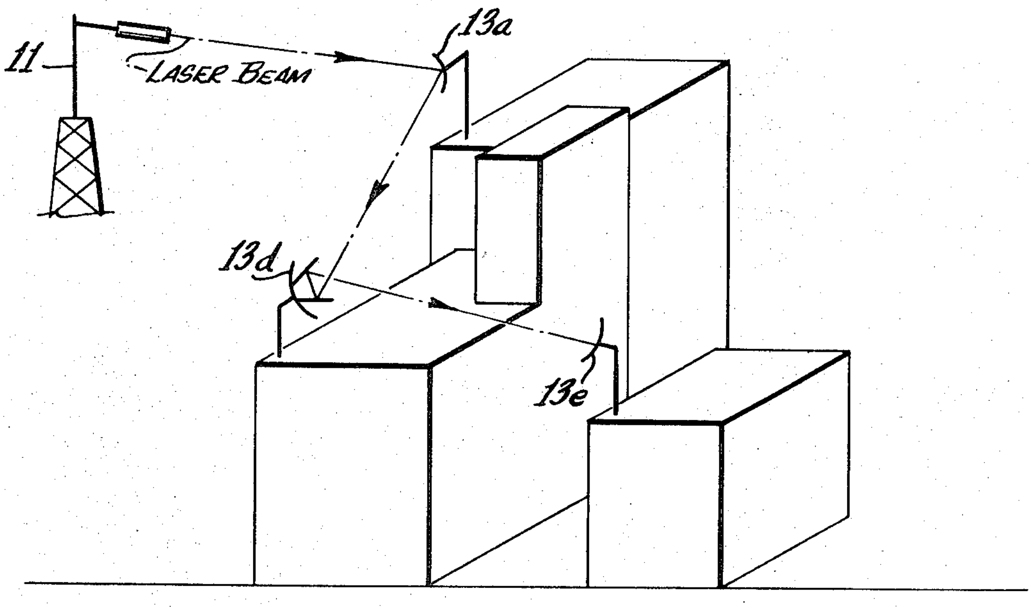
FIG. 2B shows a local section of the laser communications system.

In each neighborhood the tallest building could be equipped with a receiver and the detector and by the use of reflecting mirrors other buildings blocked from direct line of sight from the transmitting laser could receive the laser signal. FIG. 2B indicates a laser transmitter 11, sending a modulated laser beam to detector 13*a*. By means of reflecting mirrors the beam is deflected to detector 13*d* which also has reflecting mirrors to deflect the beam to detector 13*e*. Should a building be blocked off by surrounding conditions, additional mirrors could be situated at such positions as to provide additional reflective paths which will enable the beam to bypass the obstruction and be directed to the target building.

In order to achieve the high linearity and broad bandwidth necessary for communications, it is necessary to use unique methods of laser modulation and detection. Previously, the most common methods of modulation used the Kerr cell utilizing potassium dihydrogen crystals. Another method modulation utilized the Pockels cell containing similar crystals.

The modulation techniques in the past have suffered linearity limitations in that the depth of modulation follows a sinusoidal function as is common to all modulators employing the electro-optic effect. To reduce this effect systems have been developed wherein the RF voltage is used in a cavity resonant at a high frequency to chop the light at an RF rate. The linearity problem is then transferred to the RF source. Such systems, however, have limited bandwidth since the cavity and Lecher lines have an inherently high Q.

The modulator described hereinafter is capable of modulation with a wide bandwidth and yet high linearity. The system utilizes the modulating crystal as part of a high-frequency oscillator which is frequency modulated with the desired information. This concept differs from prior art laser modulating systems in that it is an integral part of the RF source and not just a load imposed upon it. Common practice in the past has been to incorporate the cell in a segment of waveguide through which RF energy from an oscillator is passed. The RF energy is eventually absorbed in a dummy load or reflected to the oscillator. In either case, the bandwidth and RF amplitude are adversely affected by the high Q of the associated waveguides, cavities, and the resulting standing waves within them which normally arise. In this invention no cavities or other wavelength restrictive items are used.

For the purpose of explanation a vacuum tube oscillator of the Colpitts type will be described. It will be understood, however, that a transistor, tunnel diode or any other active device which utilizes an external frequency-determining element could be used as well.

Figure 3:
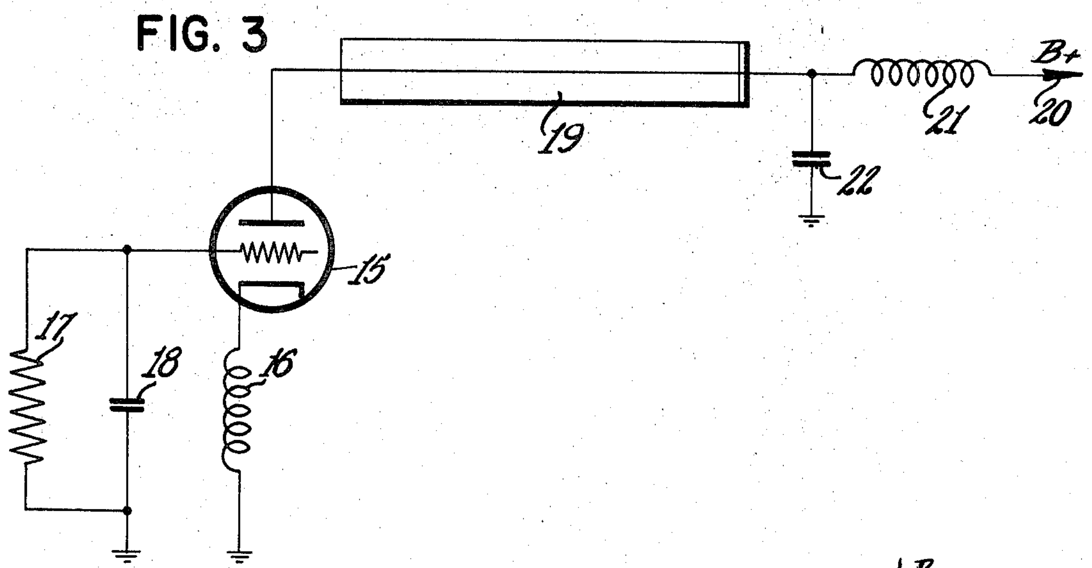
FIG. 3 is a schematic of an oscillator employing a Lecher line or a coaxial cable.

FIG. 3 illustrates the basic oscillator using a Lecher line or a coaxial cavity to determine frequency of oscillation. The cathode of vacuum tube 15 is grounded through inductance 16. The grid is biased by means of grid resistor 17 and grid capacitor 18. Line or cavity 19 connected to the tube plate of tube 15 determines the frequency of oscillation. The B+ supply 20 is applied to the plate through an inductor 21. A capacitor 22 acts as an open circuit for the B supply but has a low reactance at the frequency of oscillation.

The line or cavity 19 used is one-fourth wavelength long. The oscillator would also resonate at 3 λ4 if the inductor were changed to a tuned element to render that the dominant mode (low impedance at λ4, high impedance at 3 λ4).

Figure 4:
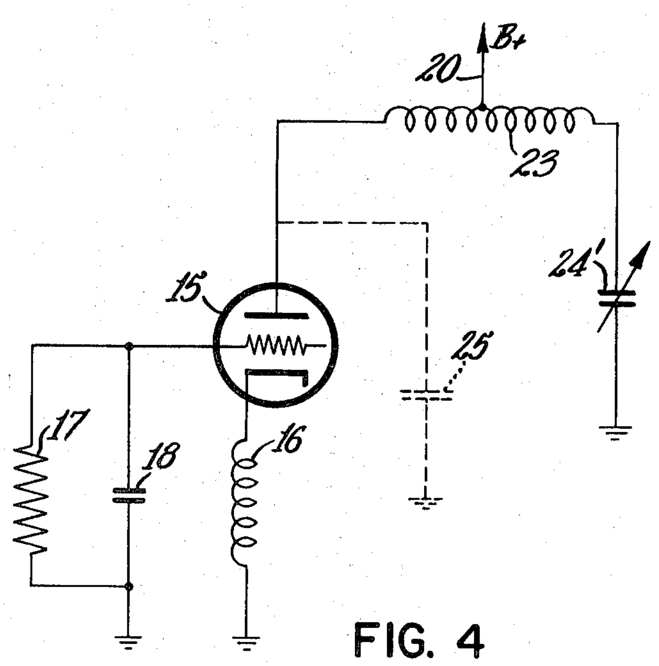
FIG. 4 is the equivalent of FIG. 3 using distributed capacity.

Although in the usual case at ultra-high frequencies a line or cavity would be employed, for purposes of explanation lumped constants will be used. The circuit of FIG. 4 is the lumped constant equivalent of FIG. 3. In FIG. 4 the frequency of oscillation is determined by the grounded center tank consisting of inductance 23, variable tank capacitance 24' and the plate capacitance 25 inherent in the system and shown by the dotted lines. The B+ supply 20 is shown as a series feed and is applied to the tank inductance 23 itself.

Figure 5:
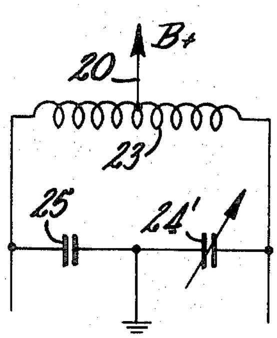
FIG. 5 and FIG. 6 are variations of the oscillator tank circuit.
Figure 6:
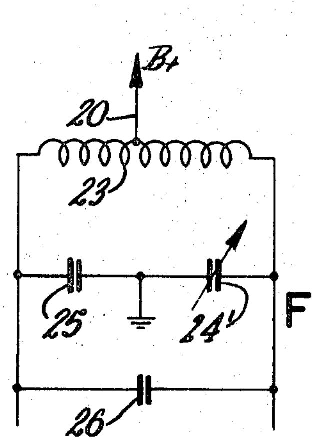

FIG. 5 illustrates the grounded center tank circuit wherein the equivalent plate capacitance 25 has been included in the tank circuit itself. If the tank capacitance 24' equals the plate capacitance the frequency is determined by the inductance 23 and the series combination of the two capacitances which is one-half the plate capacitance. The tank circuit can be shunted by a capacitance 26 as shown in FIG. 6 which would further lower the frequency. If capacitance 26 is made a varactor diode or voltage capacitor, the frequency of oscillation can be made to vary with the level of the input voltage. Varactors are unique in that their capacity varies with the level of the reverse bias voltage applied in accordance with a square law. This is most important in that any third order or cubic component gives rise to cross-modulation or mixing of the information impressed upon it. Varactors obey the theoretical square law so closely that cross-modulation components can be held to less than one-tenth of 1 percent. This is essential if many of these laser links are to be cascaded.

Figures 7, 8B:
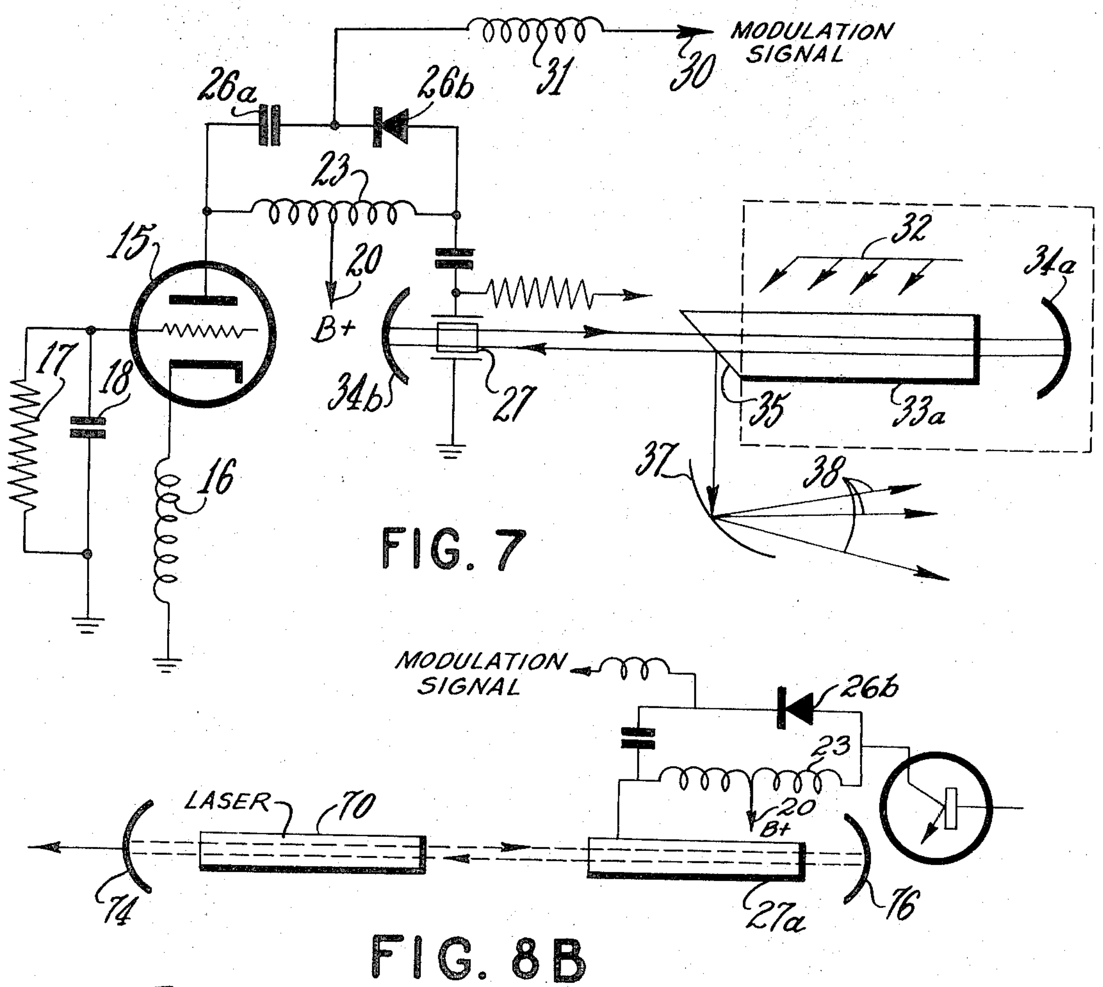
FIG. 7 is a schematic showing a frequency-modulated laser.
FIGS. 8A and 8B are schematic showings of alternative laser modulators.

FIG. 7 shows the oscillator circuit including an electro-optic crystal as part of the tank circuit. The varactor diode **26*b* is used in combination with a DC voltage-blocking condenser 26*a*. Crystal cell 27 is in series with a bypass capacitor 24 of large value. A resistor 28 connects the cell 27 to a source of bias voltage 29. The modulation input 30 is provided through an RFC 31** to the tank circuit.

The voltage appearing 2,700 the plate of tube 15 also appears across the cell 27. In a typical oscillator the peak value of the oscillator signal is approximately twice the B+ supply potential. The frequency of oscillation can be varied by varying the modulation cell capacitance 27, the varactor diode capacitance **26*b* and the plate capacitance 25**. In the modulator shown, the plate capacitance is typically 10 picofarads; the electro-optic crystal has a capacity of 6 pf. and the varactor diode has a capacity of 5–10 pf.

The oscillator circuit shown in FIG. 7 will be frequency modulated by the varactor diode **26*b*. The voltage appearing across the cell 27** will be the large RF voltage plus the bias voltage. The bandwidth is limited by the frequency excursion made possible by the varactor diode on the basic RF frequency of the oscillator. Values of ±20 percent are practical with good linearity (low cross-modulation).

By way of example, the electro-optical crystal may be a Pockels cell in the form of a square bar of lithium tantalate 0.010 inch × 0.010 inch × 0.400 inch; that is to say, a cross section to a light beam of small dimension and a length approximately 40 times the transverse dimension.

A commercially available laser 33 having a crystal face 35 ground to Brewster's Angle is used as a source of monochromatic light. The laser crystal **33*a* is shown excited from source 32**.

As the light passes to and fro through electro-optic crystal 27 between mirrors **34*a* and 34*b*, the light can be shifted in phase by the applied voltage appearing across electro-optic crystal 27** because the Index of Refraction of the crystal cell changes with the applied potential. Since the Refractive Index is the ratio of the velocity of light in vacuum to that in the crystal, it will be appreciated that as the Index of Refraction is varied, the velocity of the light will be likewise varied to provide a variable time delay.

The voltage 30 applied to the varactors is varied by a fixed increment above and below a reference level to vary the frequency.

For a lithium tantalate cell, 100 percent amplitude modulation of the laser beam is accomplished by $E$+2,700 × Length/Thickness × λ/0.63 when λ is light wavelengths measured in microns and the length and thickness are measured in identical units such as inches or meters. The length is the total path which the light travels. In the system used, since the light passes through twice the length would be twice the physical dimension.

The number 2,700 is half the wavelength constant whereby 2,700 volts across a cube at 0.63 microns or 6,300 Angstroms produces a 180° phase shift.

The light output 36 from the laser is transmitted to numerous detectors by means of the dispersion optic 37. The signals 38 are thus transmitted.

Thus there has been provided a monochromatic system wherein a laser beam is modulated by an electro-optic crystal. In this system, the phase or polarization plane of the light reflecting between two mirrors is caused to shift by means of an electro-optic effect so as to cause the laser output to vary at a frequency determined by the oscillator.

The oscillator is operating at a frequency which is a function of the lumped and distributed L and C values. The electro-optic cell and varactor provide part of the total capacitance. The capacity contributed by the varactor is varied by varying the voltage applied thereto.

In the present system the modulating element is an operating component of the oscillator and is essentially lossless and therefore requires very low power levels to modulate large light energy levels. Modulation efficiencies in excess of 100 percent may be achieved in contrast to heretofore accepted modulation efficiencies of about 30 percent.

Figure 8A:
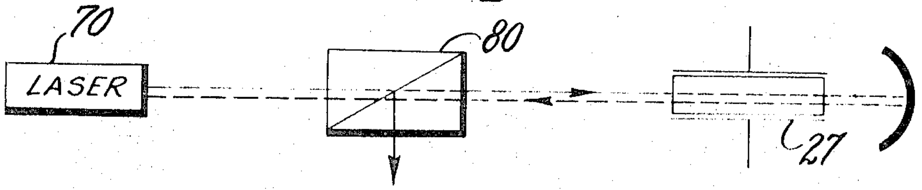

While a laser having a Brewester's Angle termination is preferred, another embodiment using a Rochon Prism 80 may be substituted, as shown in FIG. 8A. In this case, the light passes through relatively undeflected, but polarized. The light passes to and fro the electro-optic cell 27 where it is rotated 90° or 0° depending upon the RF voltage at that instant. Returning the light will reflect from the prism interface **80*a* if rotated 90° and will pass through to the laser 70** if not rotated.

Rotation occurs at an approximate rate of 1,000 mHz. depending on the instantaneous frequency of the oscillator. It will be recalled that the frequency is varied by varying the voltage of the varactor.

The embodiment of FIG. 8B provides means to switch the laser on and off. Laser 70 emits light which is reflected between half-silvered mirror 74 and reflecting mirror 76. The light beam passes through a phase-shifting cell **27*a***. Irrespective of the presence or absence of a modulation voltage the laser is switched on and off by the oscillator signal causing a 180° phase shift at the oscillator frequency of say, 1,000 mHz.

Another crystal material presently available which is suitable for crystal 27 is lithium niobate. The laser and crystal art is rapidly developing and it is expected that other suitable materials will become available.

The detector used with the modulated laser source must be sensitive to the laser radiation wavelength and must have a time constant which permits it to respond at the RF frequency. In the past photomultipliers and semiconductor diode cells which exhibit the necessary characteristics have been used. The output of the cell is frequency modulated RF which may be processed by some form of frequency discriminator.

Figure 9:
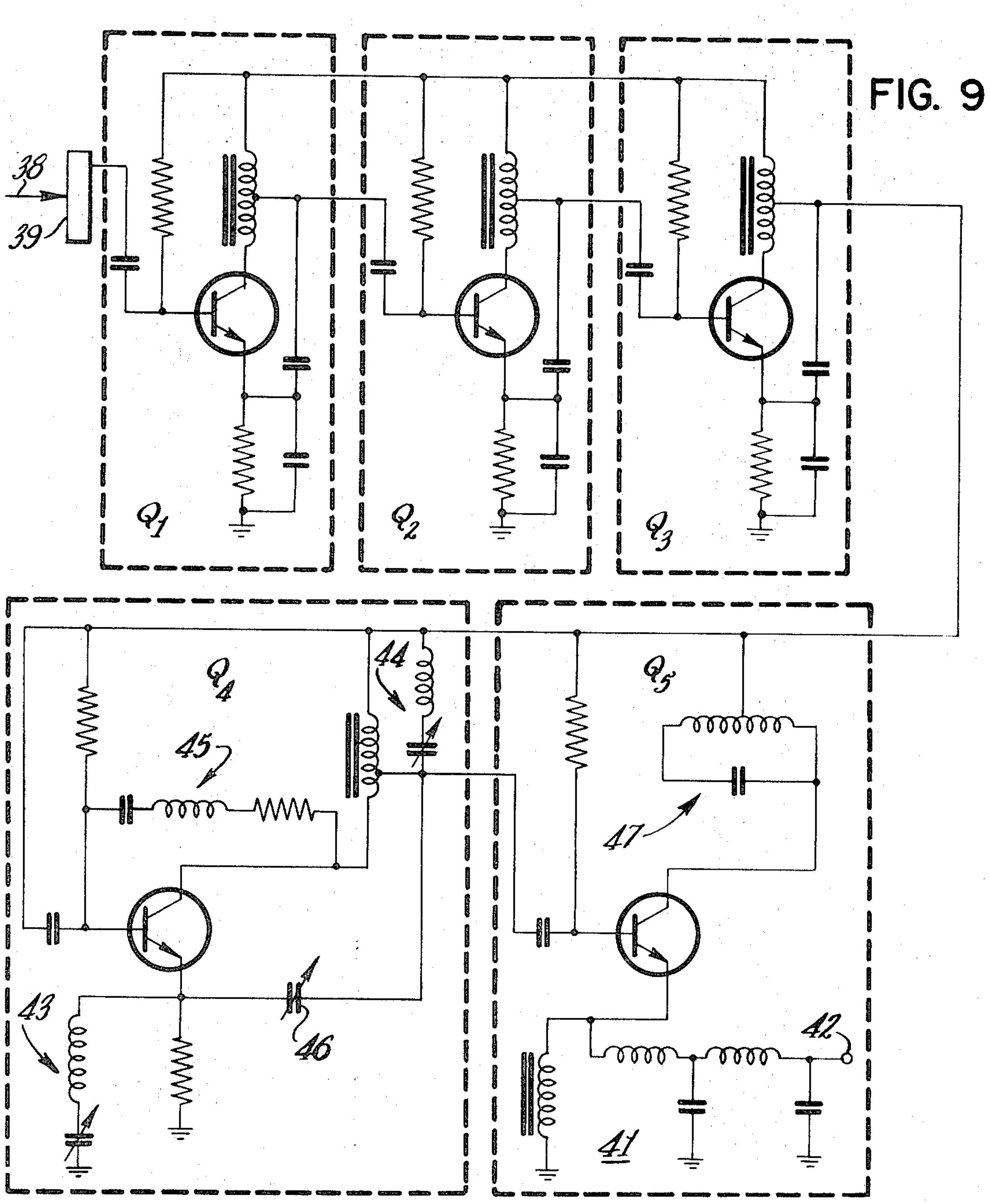
FIG. 9 is a schematic of the detector.

FIG. 9 shows the schematic diagram of a detector used with the hereinbefore described system which exhibits adequate sensitivity and exceptional linearity. The detector system is comprised of common circuits combined to perform in a specified manner.

Signal 38 is detected by a photocell 39. It is then amplified successively by repeating similar amplification sections $Q_1$, $Q_2$, $Q_3$, $Q_4$. Amplification section $Q_3$ is overdriven and therefore limiting occurs in the $Q_3$ transistor emitter to base junction. The limiting stage $Q_3$ is followed by another duplicate stage $Q_4$. However, the emitter transformer 40 of stage $Q_3$ is tapped down to prevent overloading of stage $Q_4$. The amplification stages are then followed by an emitter follower $Q_5$ biased to function as a diode detector. The output 42 is taken through a 0–200 mHz. LC low-pass filter 41. The effect of the limiting stage is to remove any AM which may have been induced by the modulating oscillator and certain random noise effects in the atmospheric path.

Figure 10:
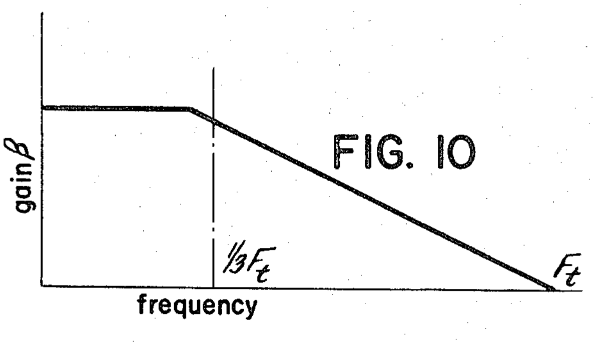
FIG. 10 is a plot of gain against frequency.

The output of the limiting stage $Q_3$ will have a 6 db./octave slope. At the output of stage $_4$ the slope will increase to 12 db./octave. The input impedance of the emitter follower $Q_5$ is effectively the load impedance times the transistor B. It is well known that transistors exhibit a roll-off characteristic with frequency. As shown in FIG. 10 this characteristic is linear at a 6 db/octave rate in the region between $\frac{1}{8}F_t$ and $E_t$ of the transistor. Since $\beta$ varies with the frequency and the input impedance of the emitter of $Q_5$ is a function of the gain $\beta$ the input impedance will vary with frequency. The signal will then appear on the emitter with an additional 6 db./octave because the input impedance decreases at 6 db./octave with increasing frequency.

The output voltage of the detector unit, as described, is quite high and contains some distortion as all diode detectors do. FIG. 9 indicates examples of compensating networks which can be added. The distortion is compensated for and reduced by varying the amplitude level with frequency. A compensator 44 of an inductance and a variable capacitance in series can be added to the collector of $Q_4$. Another compensator 43 of a series-inductance and variable capacitance can be added to the emitter of $Q_4$. A compensator 45 of a series-resistance, inductance and capacitance can be added between the base and collector of $Q_4$. For additional compensation capacitor 46 can be of a variable type. Also, compensator 47 of a low Q parallel inductance and capacitance can be added to collector $Q_5$.

All the frequency compensators described alter the device reactance and thereby change the frequency response of the device over a part of the pass band.

Although amplifiers of the type $Q_1$, $Q_2$, $Q_3$, $Q_4$ shown in FIG. 9 have been used in TV signals as amplifiers, they have presented problems of overloading. In FIG. 9 use is made of the overloading to advantage as an AM limiter. All transformers used were ferrite toroids which are effective up to about 2,000 mHz.

It should be understood that more conventional FM detectors such as ratio detectors or discriminators could also be used as will be obvious to those skilled in the art.

Figure 11:
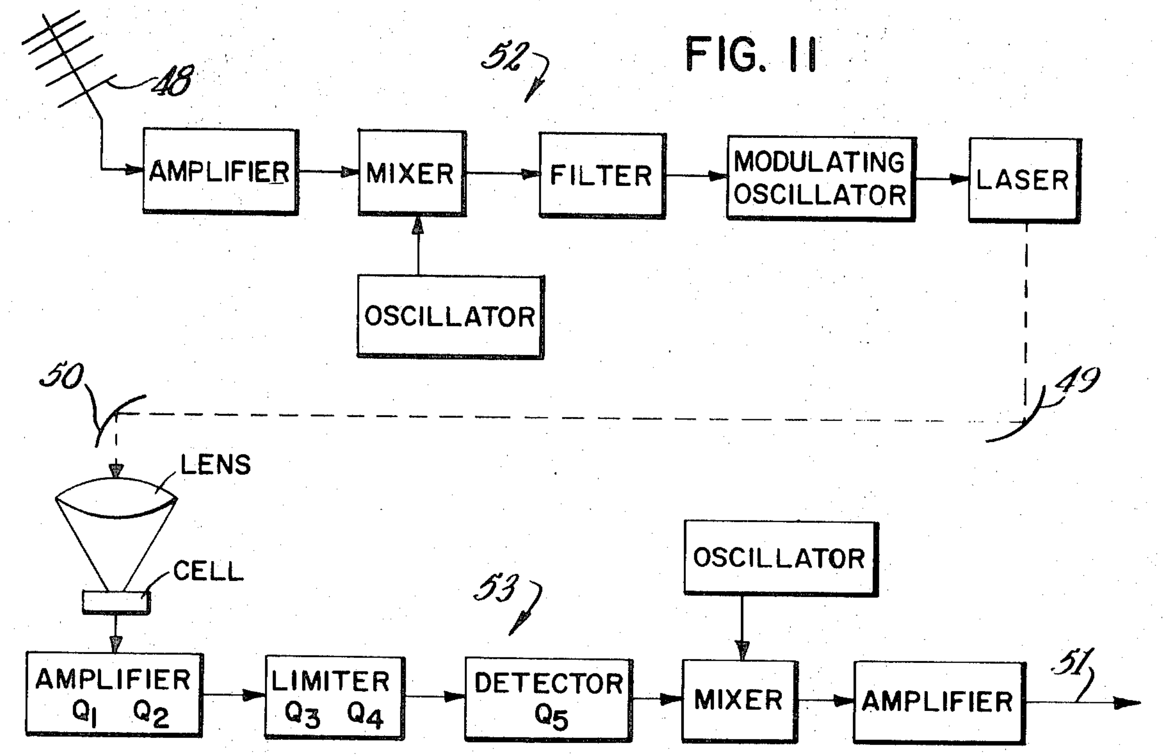
FIG. 11 is a block diagram of the entire communication system.

FIG. 11 is a block diagram of an entire modulating and detection system. The master antenna 48 receives the signal which is then amplified. The frequency allocations for VHF television in the United States are 54–88 mHz. low band, and 174–216 mHz. high band. In order to converse bandwidth a high band 166 mHz. frequency signal supplied by an oscillator is mixed with the high-band signal input to convert it down to 8–50 mHz. In this way only 88 mHz. of band-pass are required for all the United States VHF television channels. The signal passes through a 0–100 mHz. low pass filter and then the modulating oscillator as hereinbefore described modulates the laser. This limits the bandwidth necessary and further reduces the cross-modulation by requiring perfect linearity over a narrower bandwidth.

The laser beam is dispersed to the various detectors by means of a dispersion optic 49. In a particular location the modulated laser beam is received by a collecting optic 50. A lens focuses the beam onto photocell. Amplifiers $Q_1$, $Q_2$, limiters $Q_3$, $Q_4$ and detectors $Q_5$ make up the detective device as described. The signal is then reconverted back to its original low band and high band by mixing a 166 mHz. frequency signal from an oscillator with the detected signal. The final output is then sent onto a community cable 51.

Figure 13:
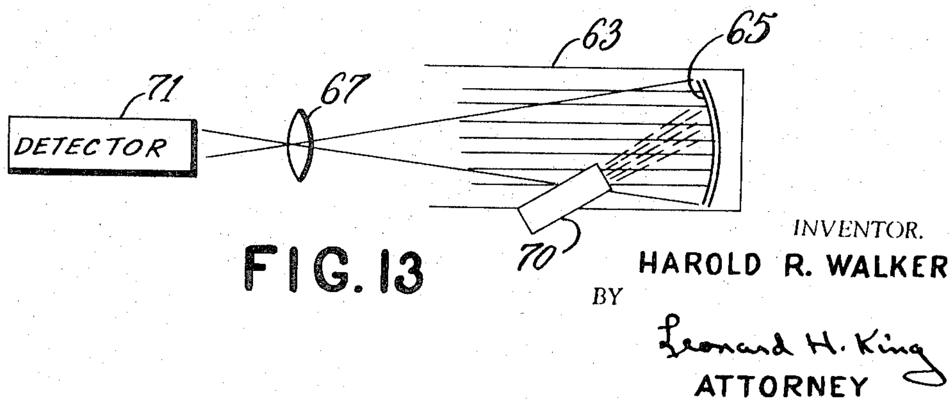
FIG. 13 is a schematic drawing of a laser beam-imaging system.

Because the normal laser beam is a very narrow, high-intensity beam capable of producing serious burns or eye damage, the output of the laser is diverged or spread out to illuminate an area. The dispersion optics consist of a concave lens 37 (see FIG. 7) at the laser to diverge the beam onto a large (several feet across) shaped backboard 65 shown in FIG. 13 which is illuminated in a manner similar to a drive-in movie screen. It is desirable to place the screen in a shadow box 63. This illuminated "movie screen" is then imaged by the detector optics 67 on the detector cell 71.

If the laser were to have a 1-watt output in a narrow beam, it could cause serious burns or eye damage. By dispersing it, the energy at the backboard is well below levels likely to cause harm. No energy is lost to the detector which has the backboard imaged on the cell. The backboard can be a concave mirror which will refocus the energy into a parallel beam or a shaped surface which disperses the energy in a desirable pattern.

Although the beam is approximately collimated the dangers of a narrow pencil laser are avoided.

Figure 12:
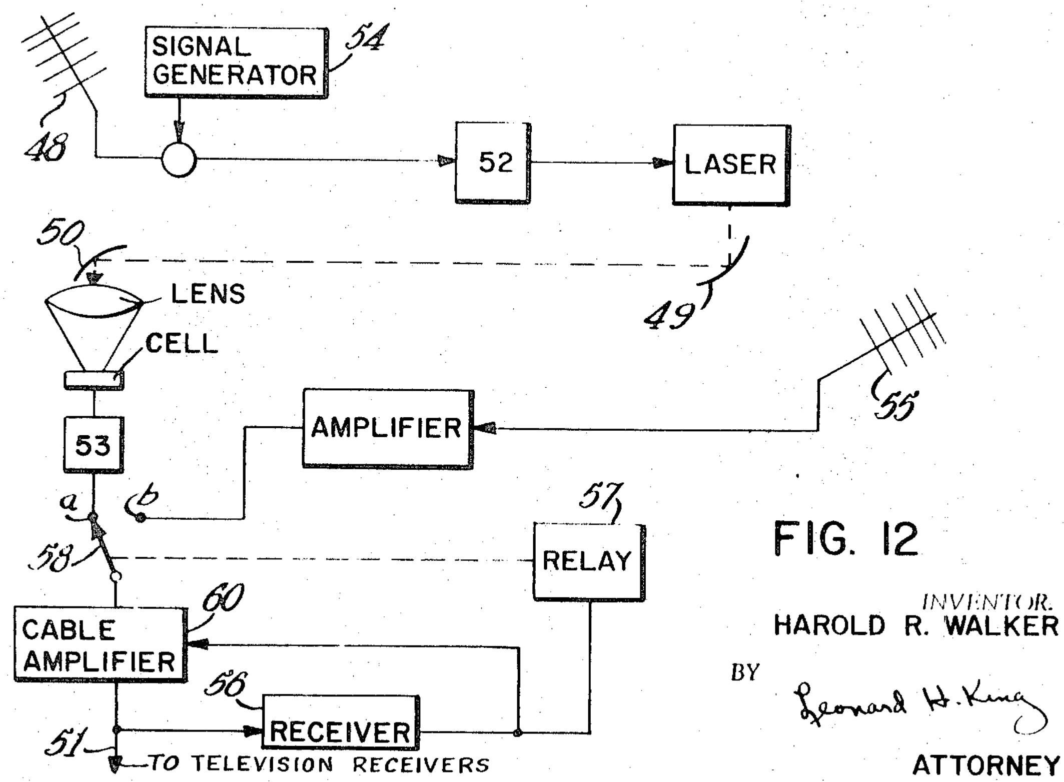
FIG. 12 is a block diagram showing an automatic backup system.

As described before the laser radiation beam may suffer from a failure of the transmission path due to heavy rain, extremely dense fog, etc. Although such periods may represent an almost negligible frequency of occurrence, FIG. 12 indicates a preferred embodiment which will prevent total loss of service during interruption of the laser link. A 74 mHz. pilot signal 54 is inserted in the transmitted signal. A conventional television antenna 55 in the detection system serves as a backup antenna in case of laser link failure. Receiver 56 responds to the 74 mHz. signal and detects the presence of this signal. When the 74 mHz. pilot signal is not detected the dropout relay 57 closes switch 58 from its normal (a) position to the backup (b) position. This connects the backup antenna 55 to the system. The 74 mHz. is also used for automatic gain control on line 59 for a cable amplifier 60.

It is intended that all matter contained in the above description or shown in the accompanying drawings shall be interpreted as illustrative and not in a limiting sense. For example, whenever reference is made in either the specification or claims to optical or light signals, it is to be understood, as is common, that this terminology shall apply equally to signals in the infrared and ultraviolet ranges as well as in the visible light spectrum.

I claim:

1. A communication system comprising a television transmitting station for the transmission of a television signal containing information; television signal receiving means remotely located from said television transmitting station arranged for receiving said television signals; conversion means associated with said television signal receiving means for detecting said television signal information, means coupled to said conversion means for modulating a beam of optical energy at a responsive to said information and for projecting said modulated beam; a local receiving station arranged for receiving said beam and including means for detecting said information signal transmitted thereby; a secondary antenna located proximate said local receiving station arranged for receiving said television signal; a communication line normally coupled to the output of said local receiving station for transmission to a plurality of external television receivers, and, switching means coupled to said beam detecting means and actuated in response to a predetermined minimum level of said detected at said local receiving station, and effective when thus actuated to disconnect said receiving station from said communication line and to connect said secondary signal receiving antenna to said communication line.

2. The communication system of claim 1, further comprising means coupled to said television signal receiving means for introducing a pilot signal into said detected television signal, said local receiving station comprising means coupled to said switching means and responsive to the level of said pilot signal received at said local receiving station for operating said switching means.

* * * * *

UNITED STATES PATENT OFFICE
CERTIFICATE OF CORRECTION

Patent No. 3,617,750 Dated November 2, 1971

Inventor(s) Harold R. Walker

It is certified that error appears in the above-identified patent and that said Letters Patent are hereby corrected as shown below:

Column 7, line 2, after "said" insert -- beam --.

Signed and sealed this 14th day of May 1974.

(SEAL)
Attest:

EDWARD M.FLETCHER,JR.
Attesting Officer

C. MARSHALL DANN
Commissioner of Patents